S. W. Baker,
Horse Collar.
No. 87,619.                    Patented Mar. 9, 1869.
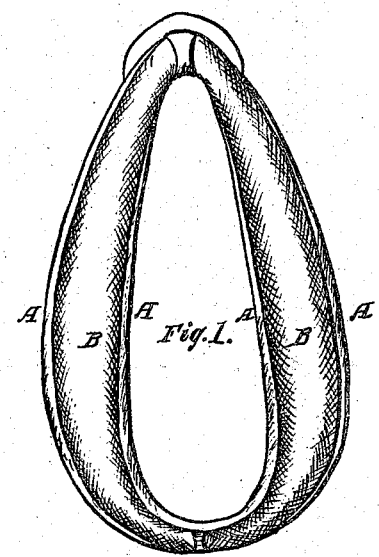
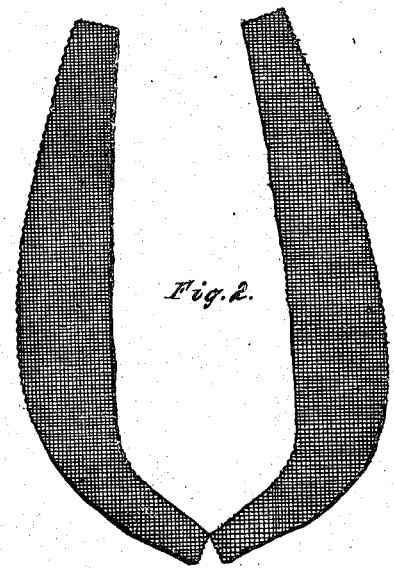
Witnesses:                                      Inventor:
Isaac A. Brownell.
William Brownell                        Seth W. Baker

United States Patent Office.

SETH W. BAKER, OF PROVIDENCE, RHODE ISLAND.

Letters Patent No. 87,619, dated March 9, 1869; antedated March 4, 1869.

IMPROVEMENT IN PADS AND LININGS FOR HORSE-COLLARS.

The Schedule referred to in these Letters Patent and making part of the same.

*To all whom it may concern:*

Be it known that I, SETH W. BAKER, of the city and county of Providence, and State of Rhode Island, have invented a new and useful Improvement in Pads and Linings for Horse-Collars and Harness; and I do hereby declare that the following is a full, clear, and exact description of the same, reference being had to the accompanying drawings, making part of this specification, in which—

Figure 1 represents a horse-collar with my improved pad or lining.

Figure 2 is a view of the lining-shape for such horse-collar.

Similar letters indicate corresponding parts in all the figures.

The object of my invention is the production of pads and linings for horse-collars, saddles, and other similar portions of the harness, of a porous material, which will absorb the perspiration, and sufficiently soft and elastic to prevent abrasion of the animal's hide.

The pads referred to, in connection with harness, for horses, consists, ordinarily, of a stuffed cushion of leather, ticking, or felt, inside of the collar, and under the saddle, next to the animal's body, to render the harness more comfortable under the draught and weight of the vehicle, and prevent wearing and galling the horse's skin.

Leather and ticking, or canvas, are quite impervious to moisture and perspiration, and the effect is, that when the animal's skin, under the collar or harness, becomes moistened by rain or perspiration, it is softened, and in consequence of the impervious and unyielding surface of the pad, the skin is abraded and made sore, particularly upon draught-horses.

The felt pad, besides being equally impervious, by reason of the fulling-qualities of the wool of which it is composed, is also heating in direct contact with the animal, and is not as suitable for the purpose as either of the other fabrics, as it is much more liable to produce abrasion and galling.

The material which I propose to employ for this purpose, is composed of a thick, porous fabric of cotton, which, while it is as strong and durable as leather, will, from its peculiar character, absorb, like a sponge, the moisture which would naturally accumulate under the collar and saddle, and by thus keeping the skin comparatively dry, prevent wholly its softening and abrasion. At the same time, the surface of the pad is so soft and elastic as to avoid the necessity, which often occurs, of lining the ordinary pad with sheep-skin or fur, to avoid the galling mentioned.

In fig. 1 of the drawings, A A is the leather exterior of the collar, and B B is the pad, or cushion, of thick-woven cotton, composed of coarse threads or yarns of warp and filling, so interwoven as to render the fabric of the thickness of four, five, or more threads, as shown in Figure 3, and proportionably porous, spongy, and elastic.

These pieces are cut into shapes, as shown in fig. 2, of a variety of sizes, and are intended to be vended to the manufacturer, to be worked into the pads of collars, in the same manner as heretofore, with the materials above mentioned.

Pads of this material, owing to its stretchy and yielding nature, can be formed of a more desirable and easy contour or shape, than of the materials heretofore used for the purpose, and can be worn with far greater comfort by the animal, and the thickness of the fabric insures a durability even greater than leather, at less than one-half the cost.

Having described my invention,

What I claim, and desire to secure by Letters Patent, is—

The pad, of thick double-woven cotton fabric, in combination with the collar A A, substantially as described.

SETH W. BAKER.

Witnesses:
 ISAAC A. BROWNELL,
 WILLIAM BROWNELL.